(12) United States Patent
Yao et al.

(10) Patent No.: US 7,417,831 B2
(45) Date of Patent: Aug. 26, 2008

(54) MICRO-ACTUATOR AND HEAD GIMBAL ASSEMBLY FOR A DISK DRIVE DEVICE

(75) Inventors: MingGao Yao, DongGuan (CN); Masashi Shiraishi, HongKong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 477 days.

(21) Appl. No.: 11/265,385

(22) Filed: Nov. 3, 2005

(65) Prior Publication Data

US 2007/0097554 A1    May 3, 2007

(51) Int. Cl.
*G11B 21/21* (2006.01)
*G11B 5/596* (2006.01)
*G11B 21/10* (2006.01)

(52) U.S. Cl. ................... 360/294.4; 360/234.6

(58) Field of Classification Search .............. 360/234.6, 360/294.1, 294.2, 294.3, 294.4
See application file for complete search history.

(56) References Cited

U.S. PATENT DOCUMENTS

| | | | |
|---|---|---|---|
| 5,299,081 A | 3/1994 | Hatch et al. | |
| 5,611,707 A | 3/1997 | Meynier | |
| 5,636,089 A | 6/1997 | Jurgenson et al. | |
| 5,898,544 A | 4/1999 | Krinke et al. | |
| 6,198,606 B1 | 3/2001 | Boutaghou et al. | |
| 6,538,836 B1 | 3/2003 | Dunfield et al. | |
| 6,587,313 B2 * | 7/2003 | Kurihara et al. | 360/294.4 |
| 6,617,763 B2 | 9/2003 | Mita et al. | |
| 6,624,984 B2 | 9/2003 | Lewis et al. | |
| 6,671,131 B2 | 12/2003 | Kasajima et al. | |
| 6,700,727 B1 | 3/2004 | Crane et al. | |
| 6,700,749 B2 | 3/2004 | Shiraishi et al. | |
| 6,831,815 B2 * | 12/2004 | Kasajima et al. | 360/294.4 |
| 6,930,860 B1 * | 8/2005 | Coffey | 360/294.4 |
| 6,950,266 B1 | 9/2005 | McCaslin et al. | |
| 7,046,486 B1 * | 5/2006 | Coffey | 360/294.4 |
| 7,277,259 B2 * | 10/2007 | Yamamoto et al. | 360/294.4 |
| 7,312,956 B2 * | 12/2007 | Yao et al. | 360/294.4 |
| 2002/0141117 A1 * | 10/2002 | Kasajima et al. | 360/294.4 |

(Continued)

FOREIGN PATENT DOCUMENTS

JP          2002-74871          3/2002

(Continued)

OTHER PUBLICATIONS

U.S. Appl. No. 11/238,998, filed Sep. 2005, Yang et al.

(Continued)

*Primary Examiner*—William J Klimowicz
(74) *Attorney, Agent, or Firm*—Nixon & Vanderhye P.C.

(57) ABSTRACT

A micro-actuator for a head gimbal assembly includes a metal frame including a bottom support adapted to be connected to a suspension, a top support adapted to support a slider, and a pair of side arms that interconnect the bottom and top supports. The side arms extend vertically from respective sides of the bottom and top supports. A PZT element is mounted to each of the side arms. Each PZT element includes two PZT portions supported by a PI substrate base. The PI substrate base includes one or more bridges that physically and electrically couple the two PZT portions. The bridges are bendable so that the two PZT portions sandwich the respective side arm when mounted thereto.

25 Claims, 14 Drawing Sheets

U.S. PATENT DOCUMENTS

| | | | |
|---|---|---|---|
| 2003/0147177 | A1 | 8/2003 | Yao et al. |
| 2003/0147181 | A1 | 8/2003 | Shiraishi et al. |
| 2003/0168935 | A1 | 9/2003 | Ogawa et al. |
| 2005/0286176 | A1* | 12/2005 | Yao et al. .................. 360/294.4 |
| 2006/0023338 | A1 | 2/2006 | Sharma et al. |
| 2006/0050442 | A1 | 3/2006 | Yao et al. |
| 2006/0072247 | A1 | 4/2006 | Yao et al. |
| 2006/0082917 | A1 | 4/2006 | Yao et al. |
| 2006/0098347 | A1 | 5/2006 | Yao et al. |
| 2006/0146449 | A1 | 7/2006 | Yao et al. |

FOREIGN PATENT DOCUMENTS

JP      2002-133803      5/2002

OTHER PUBLICATIONS

U.S. Appl. No. 11/169,019, filed Jun. 2005, Yao et al.
U.S. Appl. No. 11/080,659, filed Mar. 2005, Yao et al.
U.S. Appl. No. 11/050,823, filed Jan. 2005, Yao et al.
U.S. Appl. No. 11/080,657, filed Mar. 2005, Zhu et al.
U.S. Appl. No. 11/235,549, filed Sep. 2005, Yao et al.
U.S. Appl. No. 11/304,623, filed Dec. 2005, Yao et al.
U.S. Appl. No. 11/169,003, filed Jun. 2005, Yao et al.
U.S. Appl. No. 11/125,248, filed May 2005, Yao et al.
U.S. Appl. No. 11/263,998, filed Nov. 2005, Yao.
U.S. Appl. No. 11/192,121, filed Jul. 2005, Yao et al.
U.S. Appl. No. 11/304,544, filed Dec. 2005, Yao.
U.S. Appl. No. 11/300,339, filed Dec. 2005, Yao et al.
U.S. Appl. No. 11/385,704, filed Mar. 2006, Yao et al.
U.S. Appl. No. 11/385,698, filed Mar. 2006, Yao et al.
U.S. Appl. No. 11/319,577, filed Dec. 2005, Yao et al.
U.S. Appl. No. 11/353,018, filed Feb. 2006, Yao.
U.S. Appl. No. 11/273,075, filed Nov. 2005, Yao.
U.S. Appl. No. 11/319,580, filed Dec. 2005, Yao et al.
U.S. Appl. No. 11/384,404, filed Mar. 2006, Yao.
U.S. Appl. No. 11/414,546, filed May 2006, Yao et al.
U.S. Appl. No. 11/440,354, filed May 2006, Li.

* cited by examiner

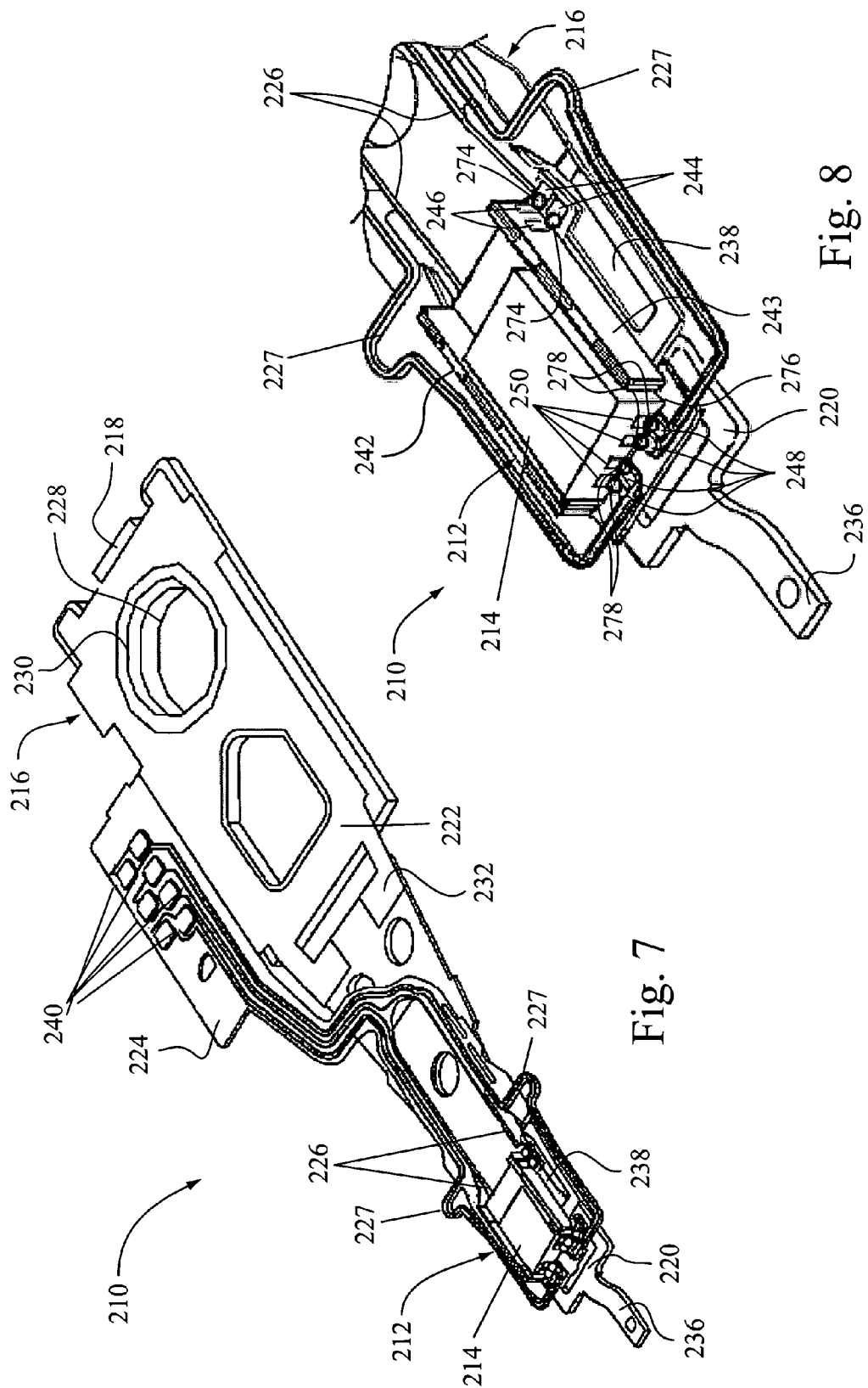

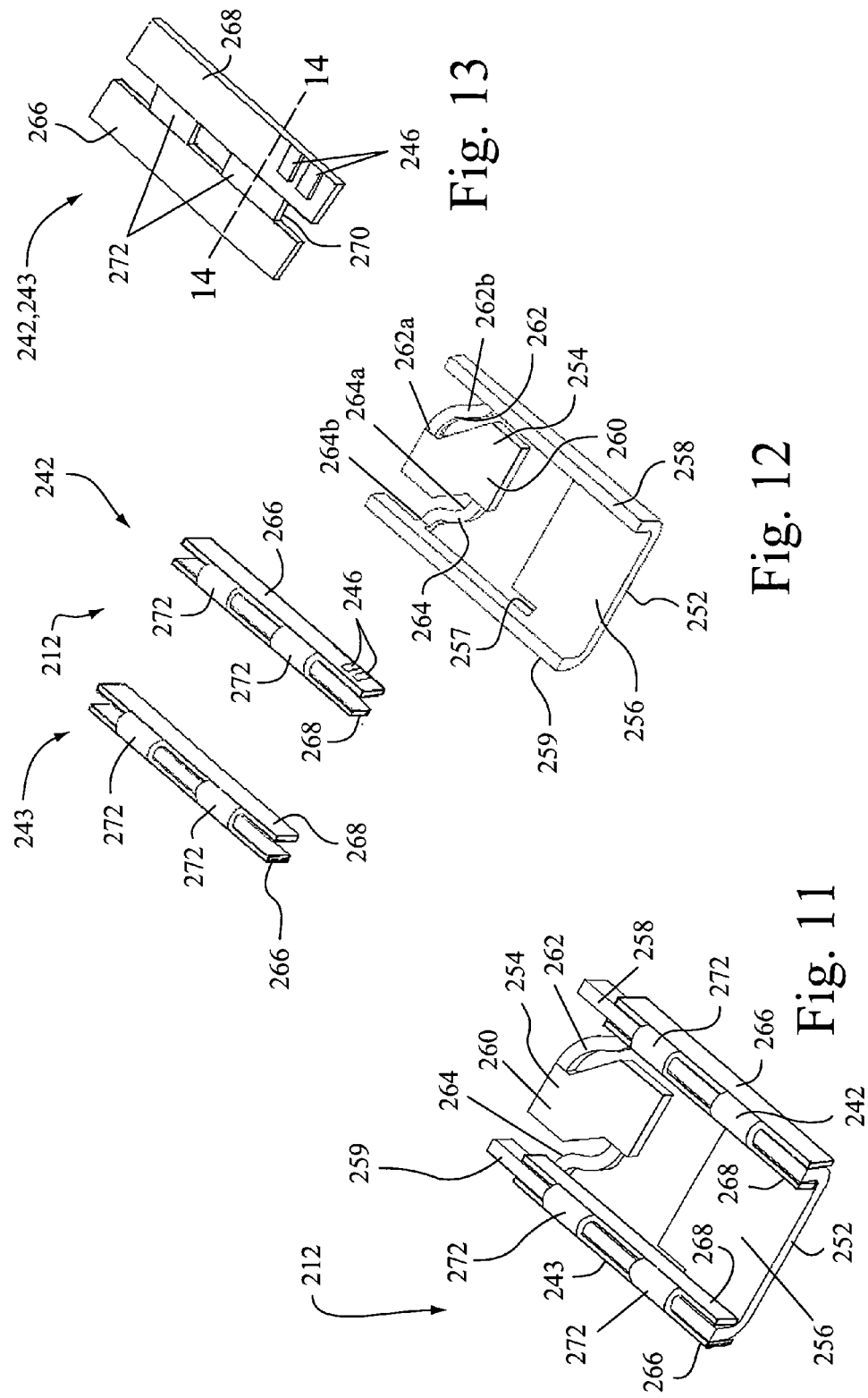

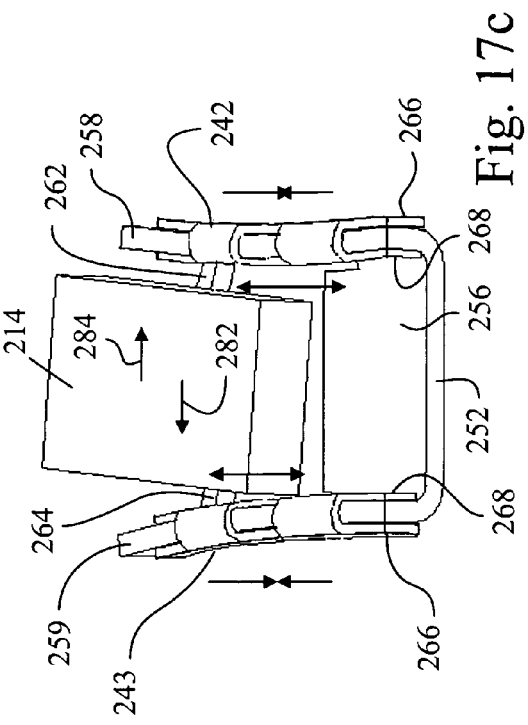
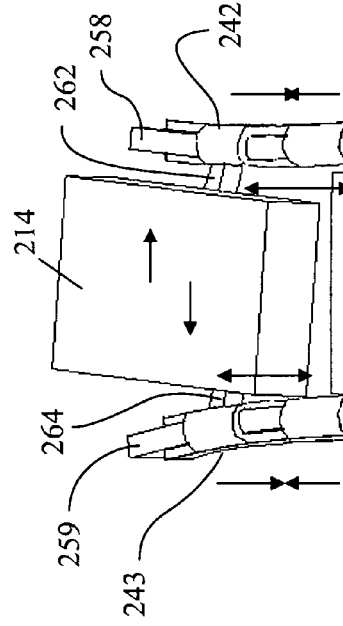
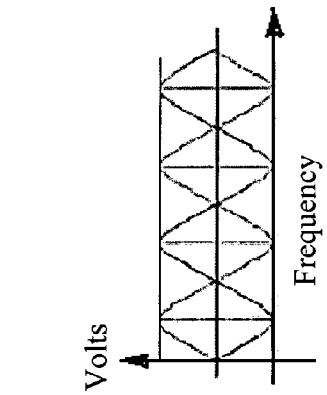
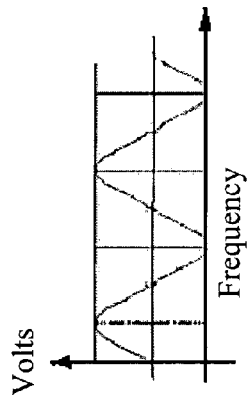
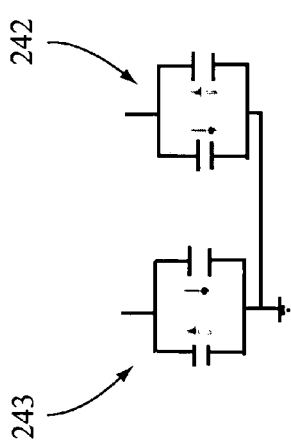
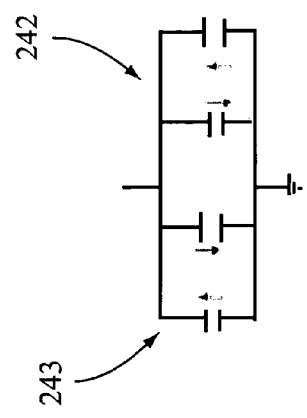

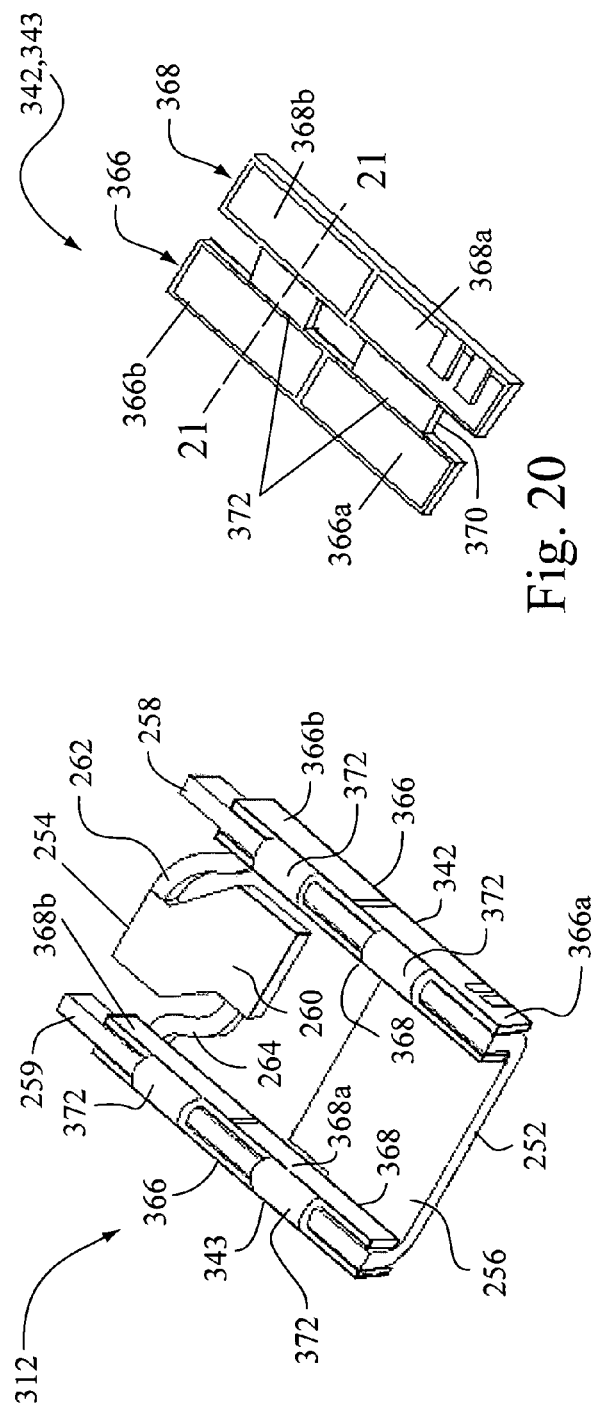
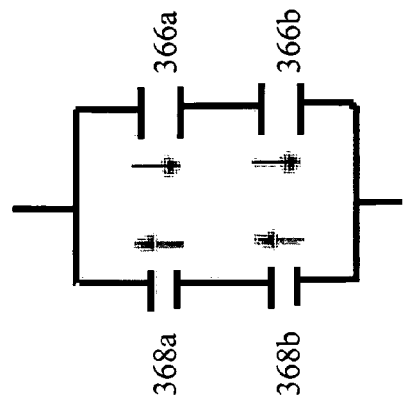
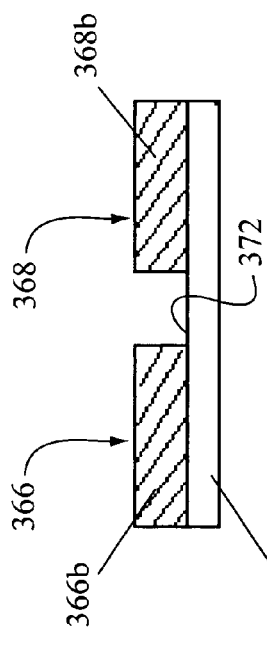

MICRO-ACTUATOR AND HEAD GIMBAL ASSEMBLY FOR A DISK DRIVE DEVICE

FIELD OF THE INVENTION

The present invention relates to information recording disk drive devices and, more particularly, to a micro-actuator for a head gimbal assembly (HGA) of the disk drive device. More specifically, the present invention is directed to a micro-actuator that is structured to improve resonance performance of the HGA.

BACKGROUND OF THE INVENTION

One known type of information storage device is a disk drive device that uses magnetic media to store data and a movable read/write head that is positioned over the media to selectively read from or write to the disk.

Consumers are constantly desiring greater storage capacity for such disk drive devices, as well as faster and more accurate reading and writing operations. Thus, disk drive manufacturers have continued to develop higher capacity disk drives by, for example, increasing the density of the information tracks on the disks by using a narrower track width and/or a narrower track pitch. However, each increase in track density requires that the disk drive device have a corresponding increase in the positional control of the read/write head in order to enable quick and accurate reading and writing operations using the higher density disks. As track density increases, it becomes more and more difficult using known technology to quickly and accurately position the read/write head over the desired information tracks on the storage media. Thus, disk drive manufacturers are constantly seeking ways to improve the positional control of the read/write head in order to take advantage of the continual increases in track density.

One approach that has been effectively used by disk drive manufacturers to improve the positional control of read/write heads for higher density disks is to employ a secondary actuator, known as a micro-actuator, that works in conjunction with a primary actuator to enable quick and accurate positional control for the read/write head. Disk drives that incorporate a micro-actuator are known as dual-stage actuator systems.

Various dual-stage actuator systems have been developed in the past for the purpose of increasing the access speed and fine tuning the position of the read/write head over the desired tracks on high density storage media. Such dual-stage actuator systems typically include a primary voice-coil motor (VCM) actuator and a secondary micro-actuator, such as a PZT element micro-actuator. The VCM actuator is controlled by a servo control system that rotates the actuator arm that supports the read/write head to position the read/write head over the desired information track on the storage media. The PZT element micro-actuator is used in conjunction with the VCM actuator for the purpose of increasing the positioning access speed and fine tuning the exact position of the read/write head over the desired track. Thus, the VCM actuator makes larger adjustments to the position of the read/write head, while the PZT element micro-actuator makes smaller adjustments that fine tune the position of the read/write head relative to the storage media. In conjunction, the VCM actuator and the PZT element micro-actuator enable information to be efficiently and accurately written to and read from high density storage media.

One known type of micro-actuator incorporates PZT elements for causing fine positional adjustments of the read/write head. Such PZT micro-actuators include associated electronics that are operable to excite the PZT elements on the micro-actuator to selectively cause expansion or contraction thereof. The PZT micro-actuator is configured such that expansion or contraction of the PZT elements causes movement of the micro-actuator which, in turn, causes movement of the read/write head. This movement is used to make faster and finer adjustments to the position of the read/write head, as compared to a disk drive unit that uses only a VCM actuator. Exemplary PZT micro-actuators are disclosed in, for example, JP 2002-133803, entitled "Micro-actuator and HGA" and JP 2002-074871, entitled "Head Gimbal Assembly Equipped with Actuator for Fine Position, Disk Drive Equipped with Head Gimbals Assembly, and Manufacture Method for Head Gimbal Assembly."

FIG. 1 illustrates a conventional disk drive unit and show a magnetic disk 101 mounted on a spindle motor 102 for spinning the disk 101. A voice coil motor arm 104 carries a head gimbal assembly (HGA) 100 that includes a micro-actuator 105 with a slider 103 incorporating a read/write head. A voice-coil motor (VCM) is provided for controlling the motion of the motor arm 104 and, in turn, controlling the slider 103 to move from track to track across the surface of the disk 101, thereby enabling the read/write head to read data from or write data to the disk 101. In operation, a lift force is generated by the aerodynamic interaction between the slider 103, incorporating the read/write transducer, and the spinning magnetic disk 101. The lift force is opposed by equal and opposite spring forces applied by a suspension of the HGA 100 such that a predetermined flying height above the surface of the spinning disk 101 is maintained over a full radial stroke of the motor arm 104.

FIG. 2 illustrates the head gimbal assembly (HGA) 100 of the conventional disk drive device of FIG. 1 incorporating a dual-stage actuator. However, because of the inherent tolerances of the VCM and the head suspension assembly, the slider 103 cannot achieve quick and fine position control which adversely impacts the ability of the read/write head to accurately read data from and write data to the disk. As a result, a PZT micro-actuator 105, as described above, is provided in order to improve the positional control of the slider and the read/write head. More particularly, the PZT micro-actuator 105 corrects the displacement of the slider 103 on a much smaller scale, as compared to the VCM, in order to compensate for the resonance tolerance of the VCM and/or head suspension assembly. The micro-actuator 105 enables, for example, the use of a smaller recording track pitch, and can increase the "tracks-per-inch" (TPI) value by 50% for the disk drive unit, as well as provide an advantageous reduction in the head seeking and settling time. Thus, the PZT micro-actuator 105 enables the disk drive device to have a significant increase in the surface recording density of the information storage disks used therein.

As shown in FIG. 2, the HGA 100 includes a suspension 106 having a flexure 108. The flexure 108 provides a suspension tongue 110 to load the PZT micro-actuator 105 and the slider 103. Two outwardly protruding traces 112, 114 are provided to the flexure 108 on opposite sides of the suspension tongue 110. Each of the traces 112, 114 has one end portion connected with a float plate 116 and another end portion connected with multi traces 118 that are electrically connected to bonding pads 120.

Referring to FIG. 3, a conventional PZT micro-actuator 105 includes a metal frame 130 which has a top support 132, a bottom support 134, and two side arms 136, 138 that interconnect the two supports 132 and 134. The side arms 136, 138 each have a PZT element 140, 142 attached thereto. The slider 103 is supported on the top support 132.

Referring to FIG. 4, the PZT micro-actuator 105 is physically coupled to the suspension tongue 110 by the bottom support 134 of the frame 130. The bottom support 134 may be mounted on the suspension tongue 110 by epoxy or laser welding, for example. Three electrical connection balls 150 (gold ball bonding or solder ball bonding, GBB or SBB) are provided to couple the PZT micro-actuator 105 to the suspension traces 118 located at the side of each PZT element 140, 142. In addition, there are four metal balls 152 (GBB or SBB) for coupling the slider 103 to the traces 118 for electrical connection of the read/write transducers. When power is supplied through the suspension traces 118, the PZT elements 140, 142 expand or contract to cause the two side arms 136, 138 to bend in a common lateral direction. The bending causes a shear deformation of the frame 130, e.g., the rectangular shape of the frame becomes approximately a parallelogram, which causes movement of the top support 132. This causes movement of the slider 103 connected thereto, thereby making the slider 103 move on the track of the disk in order to fine tune the position of the read/write head. In this manner, controlled displacement of slider 103 can be achieved for fine positional tuning.

FIG. 5 illustrates how the PZT micro-actuator 105 works when a voltage is applied to the PZT elements 140, 142. For example, when a positive sine voltage is input to the PZT element 140 of the micro-actuator which has a positive polarization, in the first half period, the PZT element 140 will shrink and cause the side arm 136 to deform as a water waveform shape. Since the slider 103 is mounted on the top support 132, this deformation will cause the slider to move or sway towards the left side. Likewise, when a negative sine voltage is input to the PZT element 142 of the micro-actuator which has a positive polarization, in the second half period, the PZT element 142 will shrink and cause the side arm 138 to deform as a water waveform shape. This deformation will cause the slider 103 to move or sway towards the right side. Of course, this operation may depend on the electric control circle and PZT element polarization direction, but the work principle is well known.

Because the PZT micro-actuator 105 moves in a sway-like manner, a suspension resonance is generated when the PZT micro-actuator 105 is operated. The suspension resonance limits the performance characteristics of the disk drive device.

For example, FIG. 6 illustrates testing data of the resonance of a prior PZT micro-actuator design. As illustrated, when the PZT micro-actuator is operated (exciting the PZT), a suspension resonance is generated due the relatively large reaction force of the suspension. The curve 160 illustrates a resonance when the suspension base plate is shaken or excited, and the curve 170 illustrates a resonance when the PZT element of the micro-actuator is excited.

Also, because the PZT element used for the micro-actuator is constructed of ceramic, the brittleness of the ceramic material will generate ceramic particles as the PZT element is continuously deformed backwards and forwards when a voltage is applied. Particles inside of the disk drive device can cause serious damage to the magnetic head and/or disk, and therefore, particle control is very tight and a particle free design is needed.

Due to limitations of ceramic PZT properties, a relatively high voltage or a multi-layer PZT element has to be used in order to achieve a target displacement to move the slider. However, a relatively high voltage is difficult for the control system of the disk drive device to complete and power consumption is big. A multi-layer PZT element will increase the mass of the micro-actuator. These drawbacks will effect the head static and dynamic performance, e.g., such as shock performance.

Additionally, a multi-layer ceramic PZT element is relatively expensive to manufacture. Thus, in order to achieve a lower cost, an improved structure for the micro-actuator is needed.

Thus, there is a need for an improved system that does not suffer from the above-mentioned drawbacks.

SUMMARY OF THE INVENTION

One aspect of the present invention relates to a micro-actuator structured to improve resonance performance of the HGA.

Another aspect of the invention relates to a micro-actuator for a head gimbal assembly. The micro-actuator includes a metal frame including a bottom support adapted to be connected to a suspension of the head gimbal assembly, a top support adapted to support a slider of the head gimbal assembly, and a pair of side arms that interconnect the bottom support and the top support. The side arms extend vertically from respective sides of the bottom support and the top support. A PZT element is mounted to each of the side arms. Each PZT element includes two PZT portions supported by a PI substrate base. The PI substrate base includes one or more bridges that physically and electrically couple the two PZT portions, and the bridges are bendable so that the two PZT portions sandwich the respective side arm when mounted thereto. Each PZT element is excitable to cause selective movement of the side arms.

Another aspect of the invention relates to a micro-actuator for a head gimbal assembly. The micro-actuator includes an N-shaped metal frame including a pair of side arms, a plate, and connection arms that interconnect the plate with the side arms. A PZT element is mounted to each of the side arms. Each PZT element includes two PZT portions supported by a PI substrate base. The PI substrate base includes one or more bridges that physically and electrically couple the two PZT portions, and the bridges are bendable so that the two PZT portions sandwich the respective side arm when mounted thereto. Each PZT element is excitable to cause selective movement of the side arms.

Yet another aspect of the invention relates to a head gimbal assembly including a micro-actuator, a slider, and a suspension that supports the micro-actuator and the slider. The micro-actuator includes a metal frame including a bottom support to connect to the suspension, a top support to support the slider, and a pair of side arms that interconnect the bottom support and the top support. The side arms extend vertically from respective sides of the bottom support and the top support. A PZT element is mounted to each of the side arms. Each PZT element includes two PZT portions supported by a PI substrate base. The PI substrate base includes one or more bridges that physically and electrically couple the two PZT portions, and the bridges are bendable so that the two PZT portions sandwich the respective side arm when mounted thereto. Each PZT element is excitable to cause selective movement of the side arms.

Still another aspect of the invention relates to a disk drive device including a head gimbal assembly, a drive arm connected to the head gimbal assembly, a disk, and a spindle motor operable to spin the disk. The head gimbal assembly includes a micro-actuator, a slider, and a suspension that supports the micro-actuator and slider. The micro-actuator includes a metal frame including a bottom support to connect to the suspension, a top support to support the slider, and a pair of side arms that interconnect the bottom support and the top support. The side arms extend vertically from respective sides of the bottom support and the top support. A PZT element is mounted to each of the side arms. Each PZT element includes two PZT portions supported by a PI substrate base. The PI substrate base includes one or more bridges that physically and electrically couple the two PZT portions, and the bridges are bendable so that the two PZT portions sandwich the respective side arm when mounted thereto. Each PZT element is excitable to cause selective movement of the side arms.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 7 is a perspective view of a head gimbal assembly (HGA) including a PZT micro-actuator according to an embodiment of the present invention;

FIG. 8 is a partial perspective of the HGA shown in FIG. 7;

FIG. 11 is a perspective view of the PZT micro-actuator shown in FIG. 7 removed from the slider and HGA;

FIG. 12 is an exploded view of the PZT micro-actuator shown in FIG. 11;

FIG. 13 is a top view of a PZT element of the PZT micro-actuator shown in FIG. 11;

FIG. 16a illustrates an embodiment of the electrical connection structure between PZT elements of the PZT micro-actuator shown in FIG. 7;

FIG. 16b illustrates a voltage applied to the PZT elements of the PZT micro-actuator shown in FIG. 7;

FIG. 16c is a top view of the slider and PZT micro-actuator of the HGA shown in FIG. 7 in use with the electrical connection structure and applied voltage of FIGS. 16a and 16b;

FIG. 17a illustrates another embodiment of the electrical connection structure between PZT elements of the PZT micro-actuator shown in FIG. 7;

FIG. 17b illustrates another voltage applied to the PZT elements of the PZT micro-actuator shown in FIG. 7;

FIG. 17c is a top view of the slider and PZT micro-actuator of the HGA shown in FIG. 7 in use with the electrical connection structure and applied voltage of FIGS. 17a and 17b;

FIG. 19 is a perspective view of a PZT micro-actuator according to another embodiment of the present invention;

FIG. 20 is a top view of a PZT element of the PZT micro-actuator shown in FIG. 19;

FIG. 21 is a cross-sectional view through line 21-21 of FIG. 20;

FIG. 22 illustrates the electrical connection structure between PZT portions of the PZT element shown in FIG. 19;

DETAILED DESCRIPTION OF ILLUSTRATED EMBODIMENTS

Figure 1:
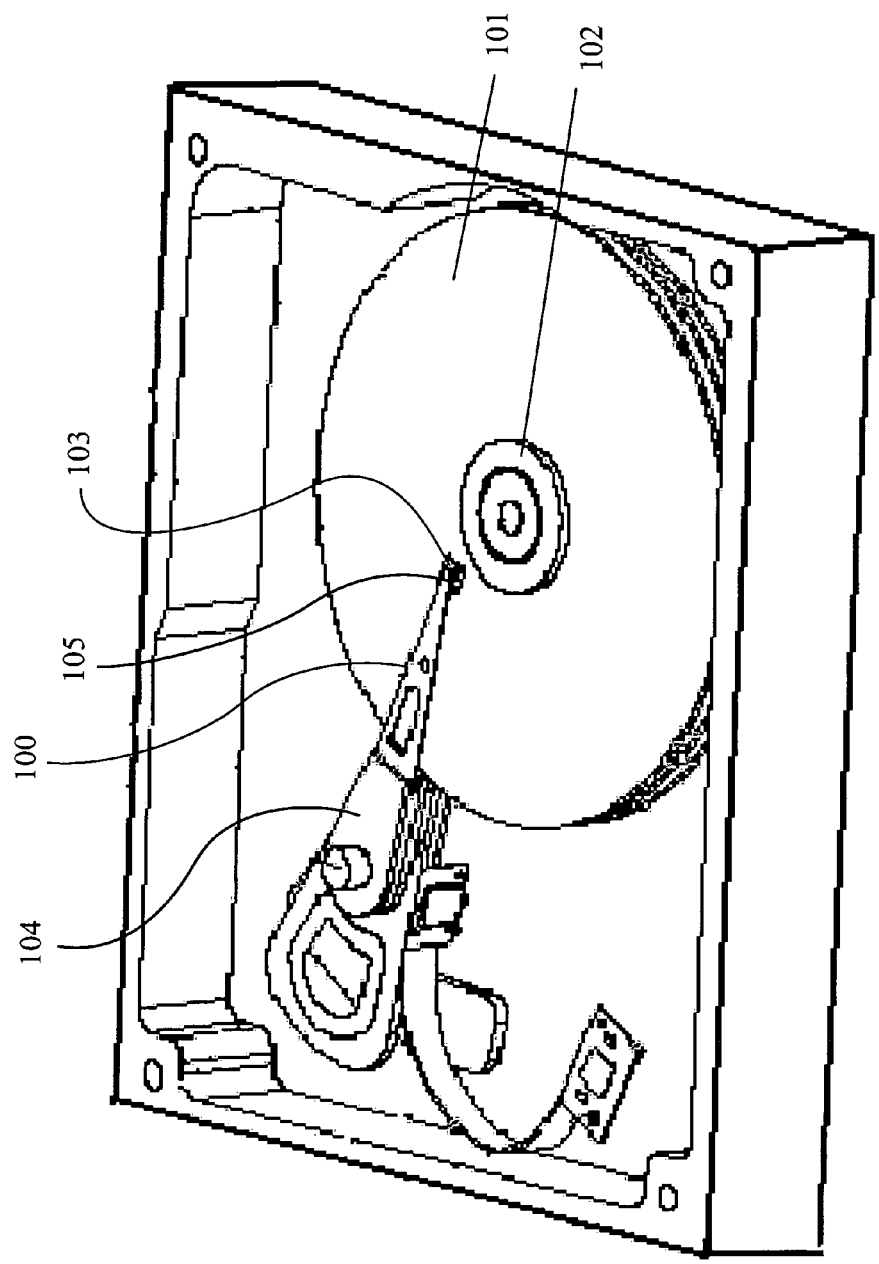
FIG. 1 is a perspective view of a conventional disk drive unit.
Figure 2:
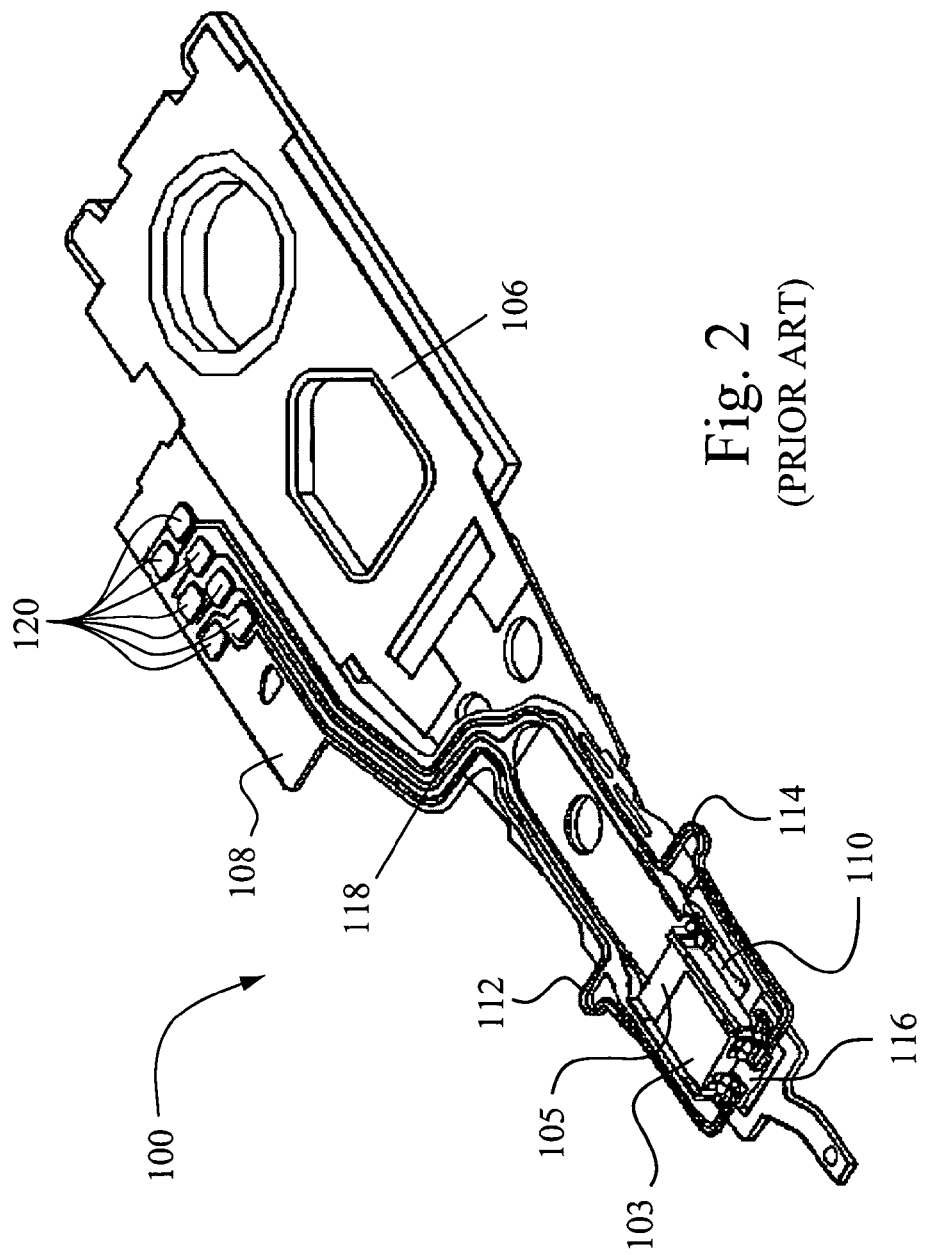
FIG. 2 is a perspective view of a conventional head gimbal assembly (HGA)
Figure 4:
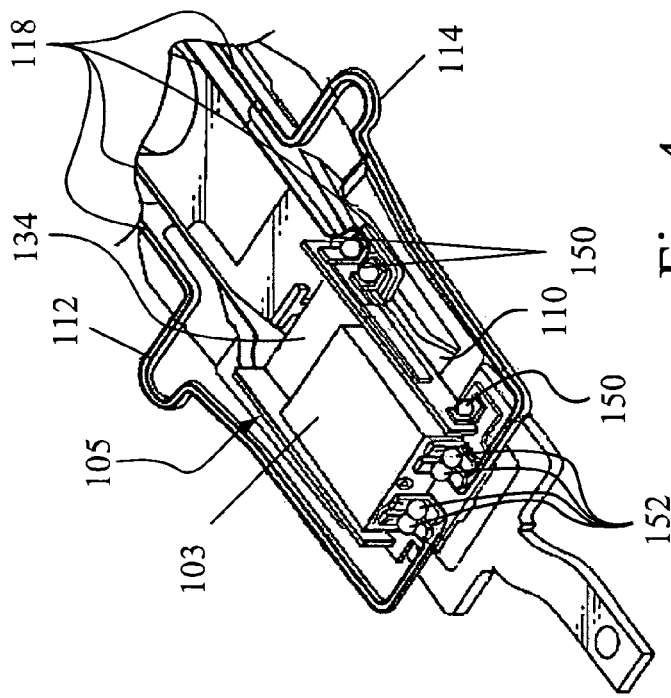
FIG. 4 is a partial perspective view of the HGA shown in FIG. 2.
Figure 3:
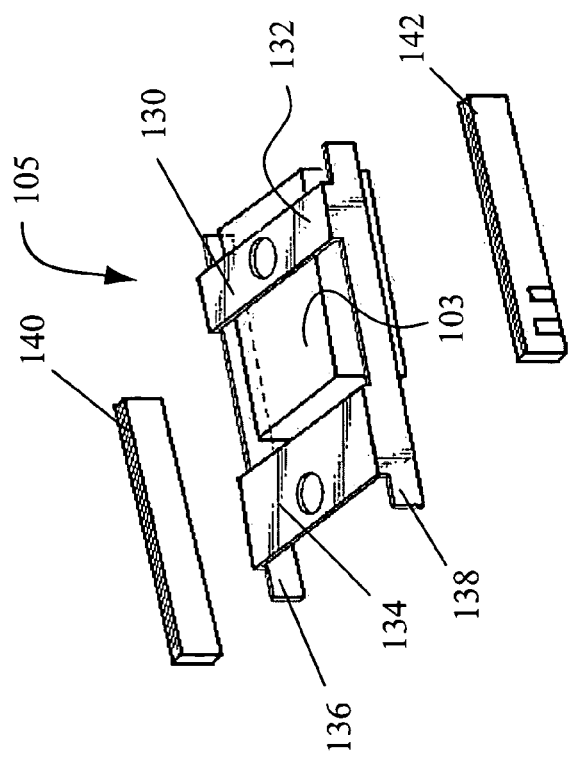
FIG. 3 is a perspective view of a slider and PZT micro-actuator of the HGA shown in FIG. 2.

Various preferred embodiments of the instant invention will now be described with reference to the figures, wherein like reference numerals designate similar parts throughout the various views. As indicated above, the instant invention is designed to improve resonance performance in a head gimbal assembly (HGA) while precisely actuating the slider using the micro-actuator. An aspect of the instant invention is to provide a rotation-type thin-film PZT micro-actuator configured to improve resonance performance in the HGA. By improving resonance performance of the HGA, the performance characteristics of the device are improved.

Several example embodiments of a micro-actuator for a HGA will now be described. It is noted that the micro-actuator may be implemented in any suitable disk drive device having a micro-actuator in which it is desired to reduce trace vibrations, regardless of the specific structure of the HGA as illustrated in the figures. That is, the invention may be used in any suitable device having a micro-actuator in any industry.

FIGS. 7-18 illustrate a head gimbal assembly (HGA) 210 incorporating a PZT micro-actuator 212 according to a first exemplary embodiment of the present invention. The HGA 210 includes a PZT micro-actuator 212, a slider 214, and a suspension 216 to load or suspend the PZT micro-actuator 212 and the slider 214.

As illustrated, the suspension 216 includes a base plate 218, a load beam 220, a hinge 222, a flexure 224, and inner and outer suspension traces 226, 227 in the flexure 224. The base plate 218 includes a mounting hole 228 for use in connecting the suspension 216 to a drive arm of a voice coil motor (VCM) of a disk drive device. The shape of the base plate 218 may vary depending on the configuration or model of the disk drive device. Also, the base plate 218 is constructed of a relatively hard or rigid material, e.g., metal, to stably support the suspension 216 on the drive arm of the VCM.

The hinge 222 is mounted onto the base plate 218 and load beam 20, e.g., by welding. As illustrated, the hinge 222 includes a hole 230 that align with the hole 228 provided in the base plate 218. Also, the hinge 222 includes a holder bar 232 for supporting the load beam 220.

The load beam 220 is mounted onto the holder bar 232 of the hinge 222, e.g., by welding. The load beam 220 has a dimple 234 formed thereon for engaging the flexure 224 (see FIG. 9). The load beam 220 functions as a spring or shock absorber to buffer the suspension 216 from the slider 214. An optional lift tab 236 may be provided on the load beam 220 to lift the HGA 210 from the disk when the disk is not rotated.

The flexure 224 is mounted to the hinge 222 and the load beam 220, e.g., by lamination or welding. The flexure 224 provides a suspension tongue 238 to couple the PZT micro-actuator 212 to the suspension 216 (see FIG. 10). The suspension tongue 238 engages the dimple 234 on the load beam 220. Also, the suspension traces 226, 227 are provided on the flexure 224 to electrically connect a plurality of connection pads 240 (which connect to an external control system) with the slider 214 and the PZT elements 242, 243 on the PZT micro-actuator 212. The suspension traces 226, 227 may be a flexible printed circuit (FPC) and may include any suitable number of lines.

Figure 10:
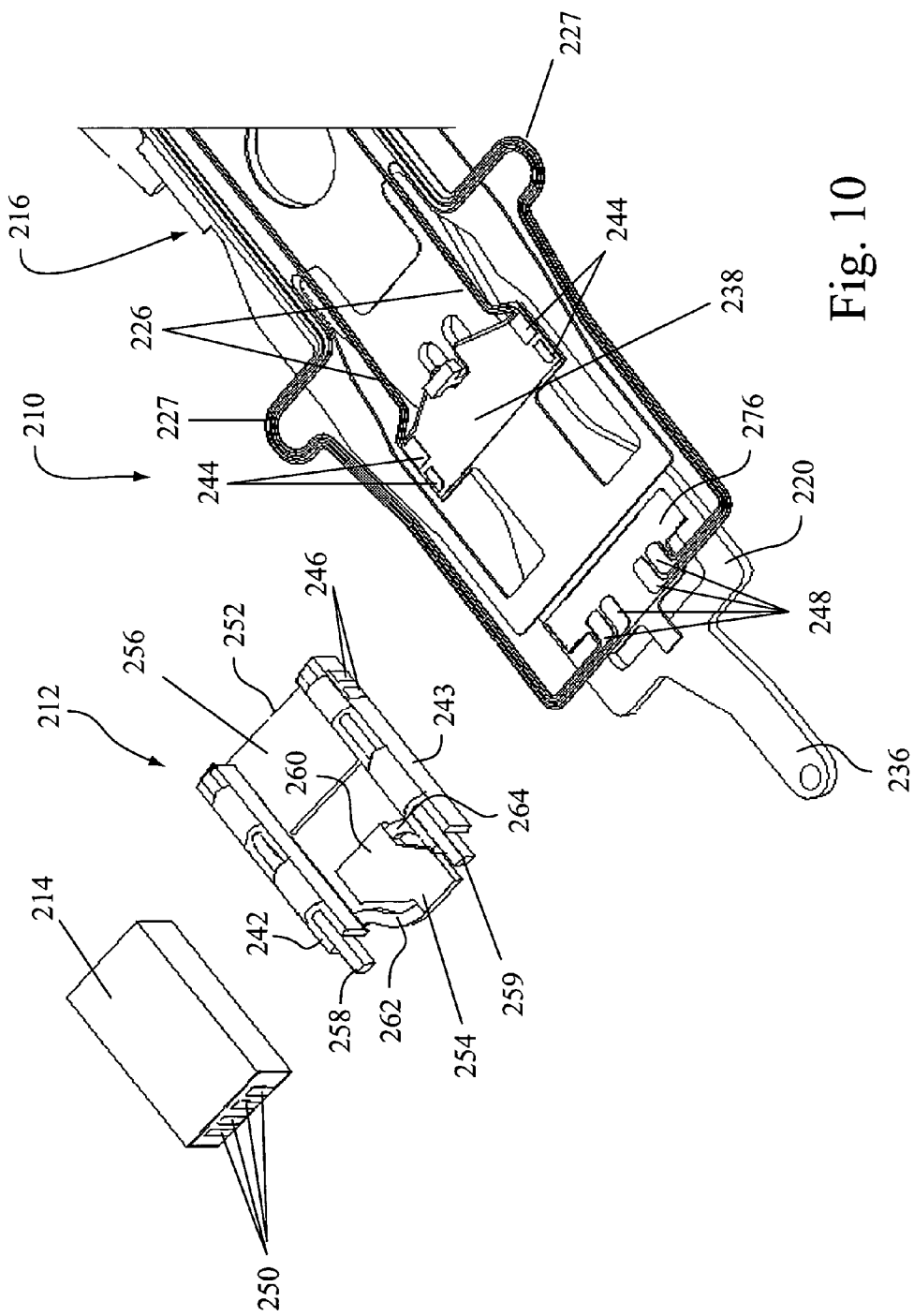
FIG. 10 is an exploded view of the HGA shown in FIG. 8.

As best shown in FIGS. 8 and 10, bonding pads 244 are directly connected to the inner suspension traces 226 to electrically connect the inner suspension traces 226 with bonding pads 246 provided on the PZT elements 242, 243. Also, bonding pads 248 are directly connected to the outer suspension traces 227 to electrically connect the outer suspension traces 227 with bonding pads 250 provided on the slider 214.

A voice-coil motor (VCM) is provided in the disk drive device for controllably driving the drive arm and, in turn, the HGA 210 in order to enable the HGA 210 to position the slider 214, and associated read/write head, over any desired information track on a disk in the disk drive device. The PZT micro-actuator 212 is provided to enable faster and finer positional control for the device, as well as to reduce the head seeking and settling time during operation. Thus, when the HGA 210 is incorporated into a disk drive device, a dual-stage actuator system is provided in which the VCM actuator provides large positional adjustments and the PZT micro-actuator 212 provides fine positional adjustments for the read/write head.

FIGS. 11 and 12 illustrate the PZT micro-actuator 212 removed from the slider 214 and the suspension 216. As illustrated, the PZT micro-actuator 212 includes a micro-actuator frame 252 and PZT elements 242, 243 mounted to the micro-actuator frame 252. The micro-actuator frame 252 includes a top support 254, a bottom support 256, and side arms 258, 259 that interconnect the top support 254 and bottom support 256. The top support 254 includes a rotatable plate 260 and connection arms or bridges 262, 264 that couple the plate 260 to respective side arms 258, 259. A PZT element 242, 243 is mounted to respective side arms 258, 259 of the micro-actuator frame 252 to provide the PZT micro-actuator 212. The micro-actuator frame 252 may be constructed of any suitable material, e.g., metal, and may be constructed using any suitable process.

As best shown in FIG. 12, the side arms 258, 259 are formed from opposing sides of the top and bottom supports 254, 256. As illustrated, inner notches 257 exist between the bottom support 256 and respective side arms 258, 259. This arrangement will allow the side arms 258, 259 more freedom of movement.

Also, the bridge 262 has opposing ends 262a, 262b, and the bridge 264 has opposing ends 264a, 264b. The ends 262a and 264a are coupled with the rotatable plate 260, and the other ends 262b and 264b are coupled with respective side arms 258, 259. In an embodiment, the ends 262b and 264b are coupled with respective side arms 258, 259 in the same location in the y-axis direction, and the ends 262a and 264a coupled with the rotatable plate 260 in mirror relation to a center of the rotatable plate 260.

Figure 14:
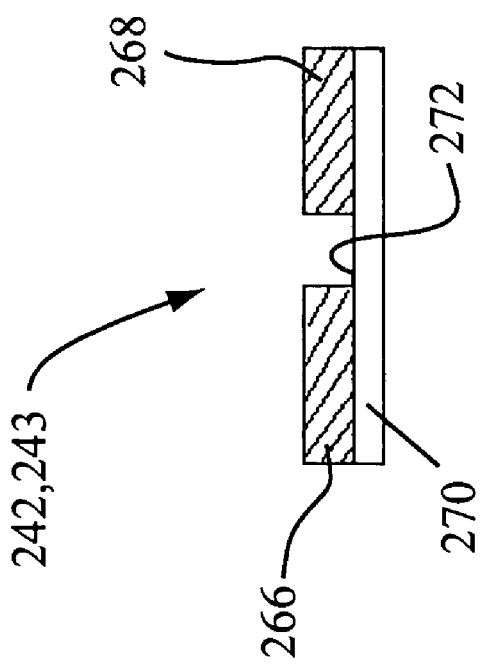
FIG. 14 is a cross-sectional view through line 14-14 of FIG. 13.

As best shown in FIGS. 13 and 14, each PZT element 242, 243 includes two PZT portions 266, 268 supported by a PI substrate base 270. The PI substrate base 270 is partially etched and couples the PZT portions 266, 268 by several narrow bridges 272, e.g., two narrow bridges. The narrow bridges 272 of the PI substrate base 270 are bendable (see FIGS. 11 and 12) so that the PZT elements 242, 243 may be mounted to respective side arms 258, 259 of the micro-actuator frame 252. When mounted, the PZT portions 266, 268 sandwich the respective side arm 258, 259 and extend on respective sides of each side arm 258, 259 as best shown in FIG. 11. Also, bonding pads 246, e.g., two pads, are provided on the PZT elements 242, 243 for electrically connecting the PZT elements 242, 243 to the inner suspension traces 226.

Each PZT portion 266, 268 has a plate-like shape and may be formed by laminated thin films consisting of piezoelectric material such as PZT and Ni—Ag or Pt or gold metal as electrode. Each PZT portion 266, 268 may be a single-layer thin-film PZT or multi-layer thin-film PZT.

Figure 15:
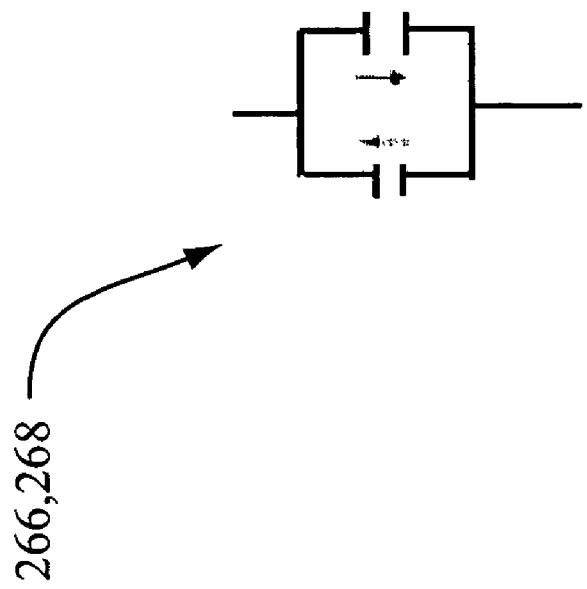
FIG. 15 illustrates the electrical connection structure between PZT portions of the PZT element shown in FIG. 13.

FIG. 15 illustrates how the two PZT portions 266, 268 in each PZT element 242, 243 are electrically coupled. As illustrated, the two PZT portions 266, 268 may have different polarizations and a parallel connection. Each PZT portion 266, 268 has an end coupled with a bonding pad 246.

Figure 9:
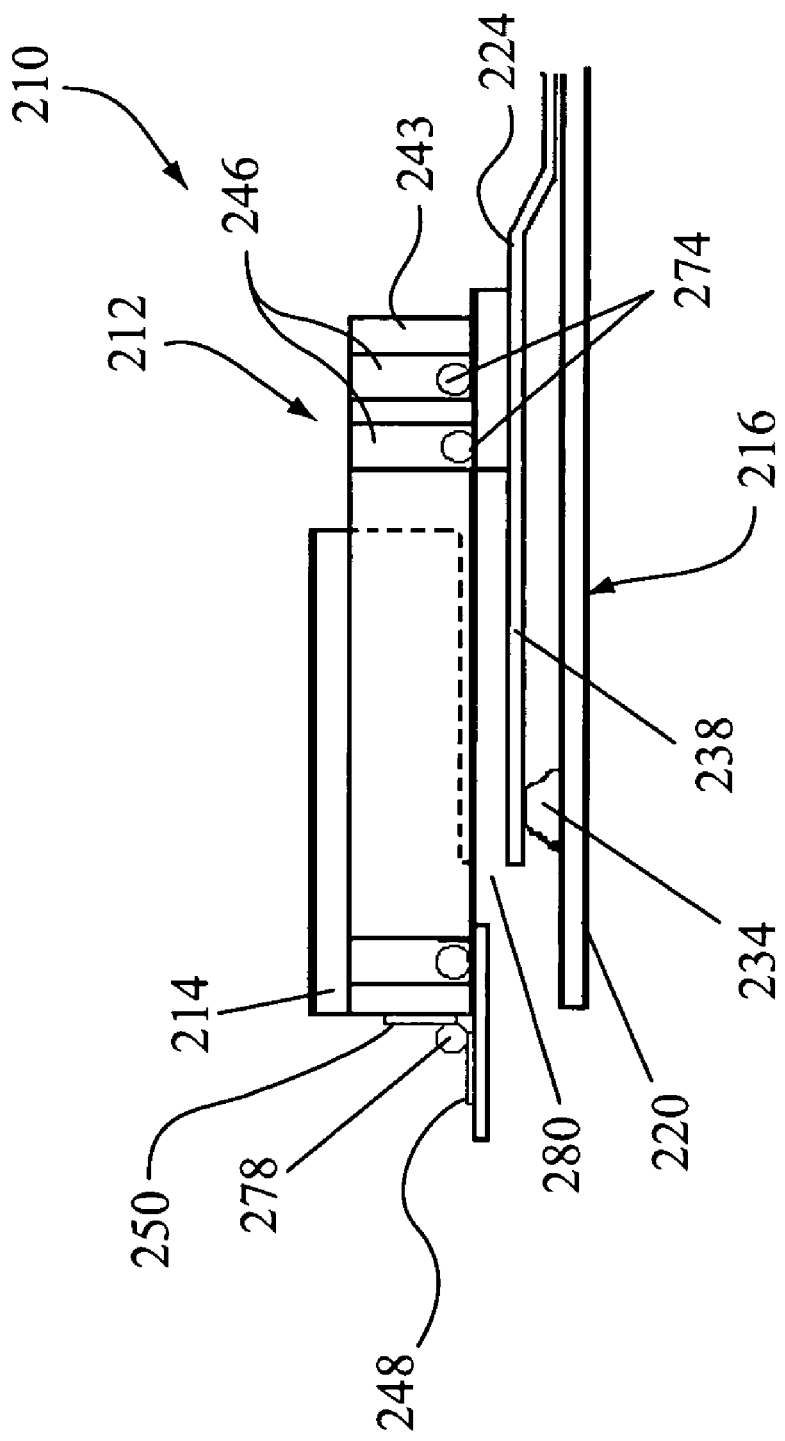
FIG. 9 is a side view of the HGA shown in FIG. 8.

As best shown in FIGS. 8-10, the bottom support 256 is structured to connect the micro-actuator frame 252 to the suspension 216. Specifically, the bottom support 256 is partially mounted to the suspension tongue 238 of the flexure 224, e.g., by epoxy, resin, or welding by laser. Also, the PZT bonding pads 246, e.g., two bonding pads, provided on respective PZT elements 242, 243 are electrically connected to respective bonding pads 244 on the inner suspension traces 226 using electrical connection balls (GBB or SBB) 274. This allows power to be applied via the inner suspension traces 226 to the PZT elements 242, 243.

The top support 254 is structured to connect the micro-actuator frame 252 to the slider 214. Specifically, the slider 214 has bonding pads 250, e.g., four bonding pads, on an end thereof corresponding to the slider bonding pads 248 provided on a float plate 276. The top support 254 supports the slider 214 thereon and the slider bonding pads 248 are electrically bonded with respective pads 250 provided on the slider 214 using, for example, electric connection balls (GBB or SBB) 278. This connects the top support 254 to the slider 214 and electrically connects the slider 214 and its read/write elements to the outer suspension traces 227 on the suspension 216. Also, a parallel gap 280 is provided between the suspension tongue 238 and the PZT micro-actuator 212 to allow the PZT micro-actuator 212 to move freely in use, as shown in FIG. 9.

FIG. 16a illustrates an embodiment of an electrical connection structure between the two PZT elements 242, 243 of the PZT micro-actuator 212, and FIG. 16b illustrates the operation voltage. As illustrated, the two different polarization PZT elements 242, 243 are connected in parallel in both side of the arm and a sine voltage is applied. As shown in FIG. 16c, when the voltage goes to the first half period, the outside PZT portion 266 of the PZT element 243 will shrink and the inner PZT portion 268 of the PZT element 243 will extend, which will cause the side arm 259 to bend towards the outside. Similarly, the outside PZT portion 266 of the PZT element 242 will shrink and the inner PZT portion 268 of the PZT element 242 will extend, which will cause the side arm 258 to bend towards the outside. Since the two bridges 262, 264 are coupled to the plate 260 in offset relation with respect to its center and the slider 214 is partial mounted on the plate 260, the slider 214 will rotate against its center towards the right side. When the voltage goes to the second half period, the outside PZT portion 266 of the PZT element 243 will extend and the inner PZT portion 268 of the PZT element 243 will shrink, which will cause the side arm 259 to bend towards the inside. Similarly, the outside PZT portion 266 of the PZT element 242 will extend and the inner PZT portion 268 of the PZT element 242 will shrink, which will cause the side arm 258 to bend towards the inside. This will cause the slider 214 to rotate against its center towards to left side. Because both side arms 258, 259 can bend in both directions, a big head displacement may be achieved.

FIG. 17a illustrates another embodiment of an electrical connection structure between the two PZT elements 242, 243 of the PZT micro-actuator 212, and FIG. 17b illustrates the operation voltage. As illustrated, the two different polarization PZT elements 242, 243 are coupled as a common ground and the other end is separated to two channels. Also, two different phase sine voltages are applied to the PZT elements 242, 243 through the two channels in one of the side arms, for example. As shown in FIG. 17c, when a positive sine voltage is input, during the first half period, the outside PZT portion 266 of the PZT element 243 will shrink and the inside PZT portion 268 of the PZT element 243 will extend, which will cause the side arm 259 to bend towards the outside and generate a peel strength 282 to the plate 260 through the bridge 264. Similarly, the outside PZT portion 266 of the PZT element 242 will shrink and the inside PZT portion 268 of the PZT element 242 will extend, which will cause the side arm 258 to bend towards outside due to the different phase voltage applied. This will generate a peel strength 284 to the plate 260 through the bridge 262. Because the peel strengths 282, 284 are applied to the plate 260 in different directions and the slider 214 is partially mounted on the plate 260, the slider 214 will rotate towards the right side against its center. When the voltage goes to the second half period, the work principle is substantially the same and the slider 214 will rotate towards the left side. Because both side arms 258, 259 can bend in both directions, a big head displacement may be achieved.

Figure 6:
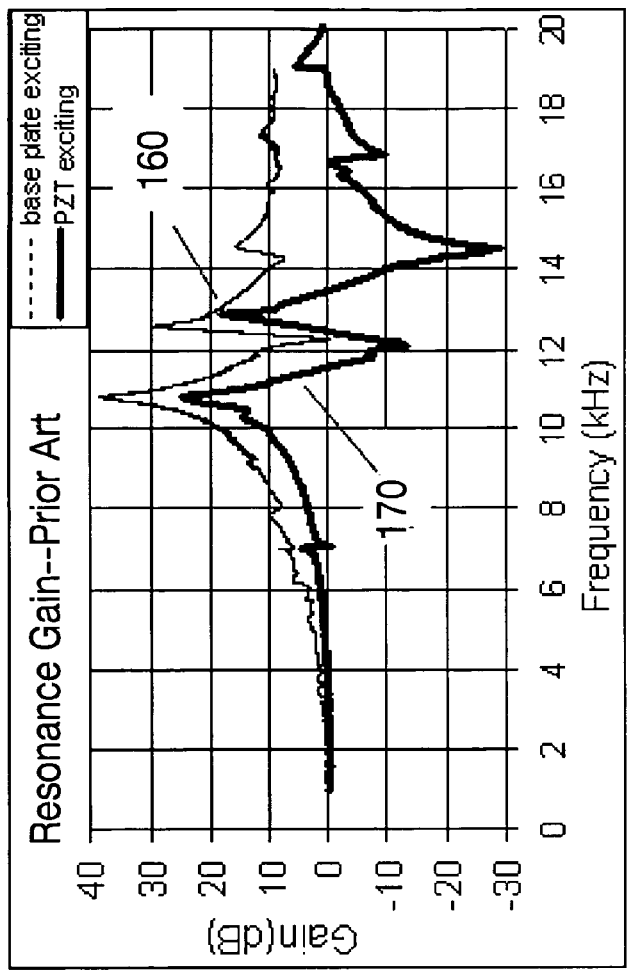
FIG. 6 shows testing data of the resonance of a prior PZT micro-actuator design.
Figure 5:
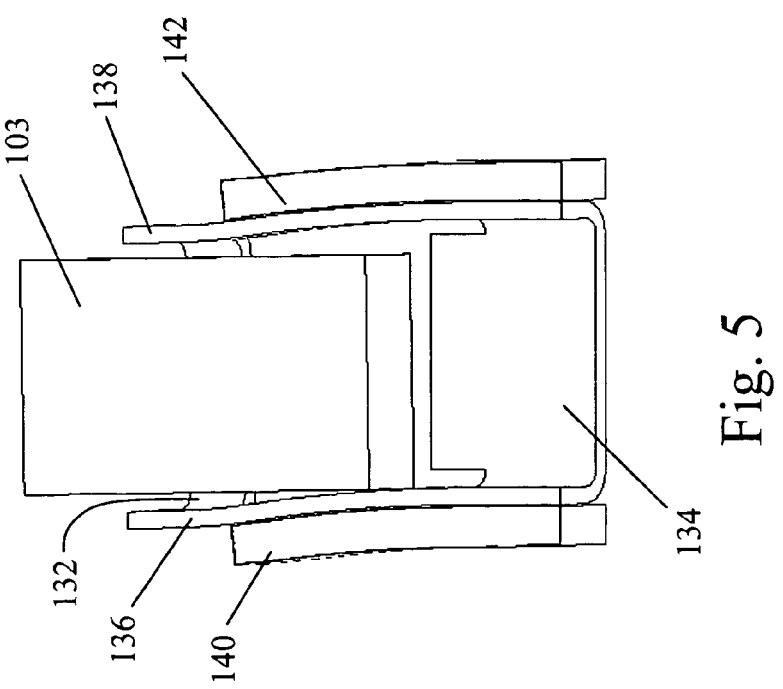
FIG. 5 is a top view of the slider and PZT micro-actuator of the HGA shown in FIG. 2 in use.
Figure 18:
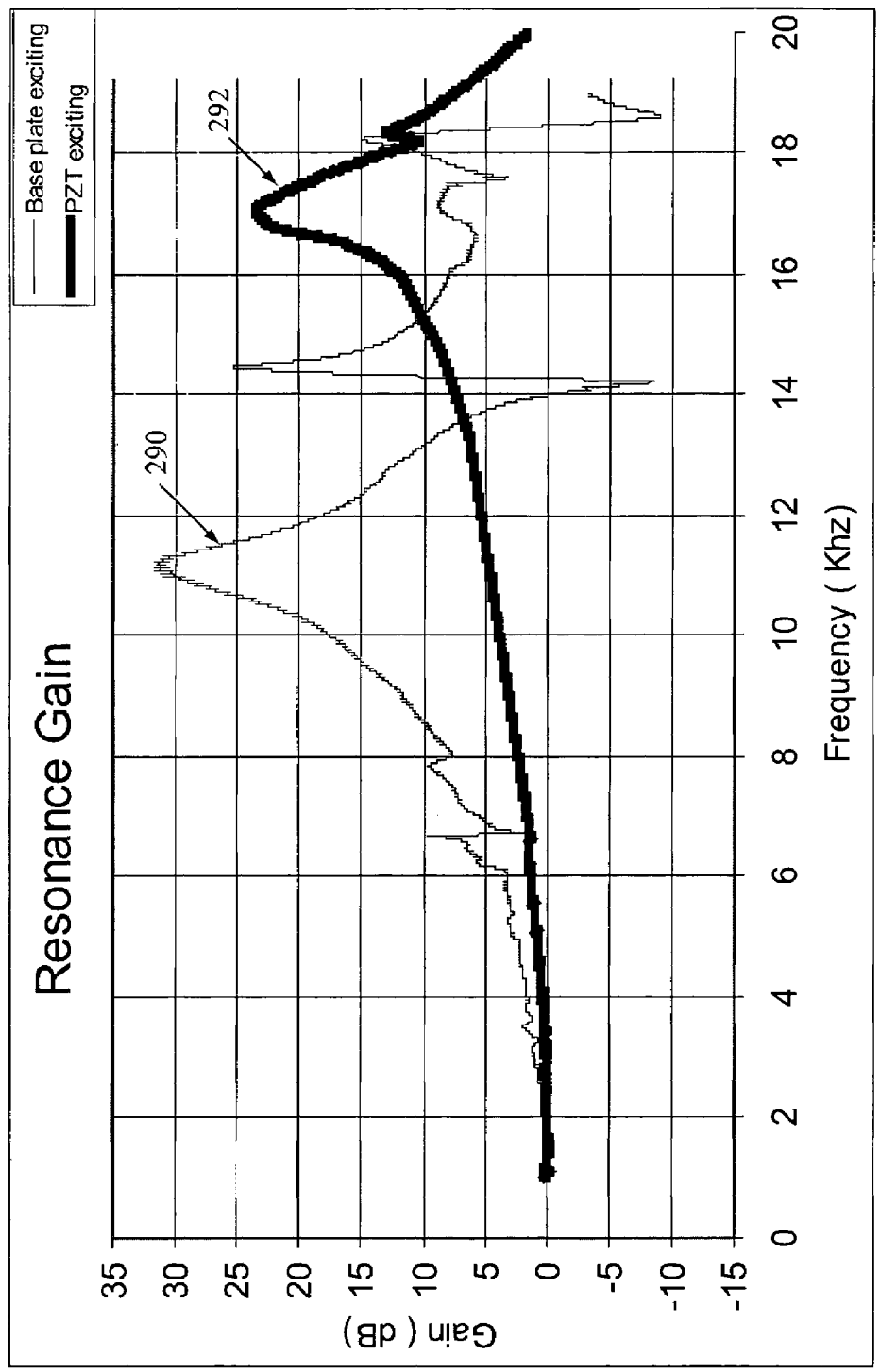
FIG. 18 shows testing data of the resonance of the PZT micro-actuator shown in FIG. 7.

FIG. 18 illustrates resonance testing data of the PZT micro-actuator 212. The curve 290 illustrates a resonance when the suspension base plate is excited, and the curve 292 illustrates a resonance when the PZT elements 242, 243 of the PZT micro-actuator 212 are excited. Since the PZT micro-actuator 212 works as a rotation-type rather than a prior sway-type, a relatively small reaction force is applied to the suspension when the PZT micro-actuator 212 is operated. That is, the PZT micro-actuator 212, does not have a suspension resonance model like the prior model represented in FIG. 6. Thus, the PZT micro-actuator 212 greatly improves the performance characteristics of the disk drive device and a high bandwidth of the servo may be achieved.

As noted above, the rotation design of the PZT micro-actuator 212 improve resonance performance. Also, the use of thin-film PZT provides a particle free PZT micro-actuator 212, which prevents particle damage to the disk drive device. Further, the PZT micro-actuator 212 provides a low cost structure that precisely actuates the slider.

FIGS. 19-22 illustrate a PZT micro-actuator 312 according to another exemplary embodiment of the present invention. In this embodiment, each PZT portion 366, 368 of a PZT element 342, 343 includes two separate units. That is, the PZT portion 366 includes units 366a and 366b, and the PZT portion 368 includes units 368a and 368b as shown in FIG. 20. As illustrated in FIGS. 20 and 21, the four units 366a, 366b, 368a, 368b are supported by a PI substrate base 370 with several bendable bridges 372, e.g., two narrow bridges. FIG. 22 shows an embodiment of the electrical coupling between the four units 366a, 366b, 368a, 368b. As illustrated, the units of each PZT portion are connected in series (and have the same polarization direction), and the PZT portions are connected in parallel. The remaining components of the PZT micro-actuator 312 are substantially similar to the PZT micro-actuator 212 and indicated with similar reference numerals.

Figure 24:
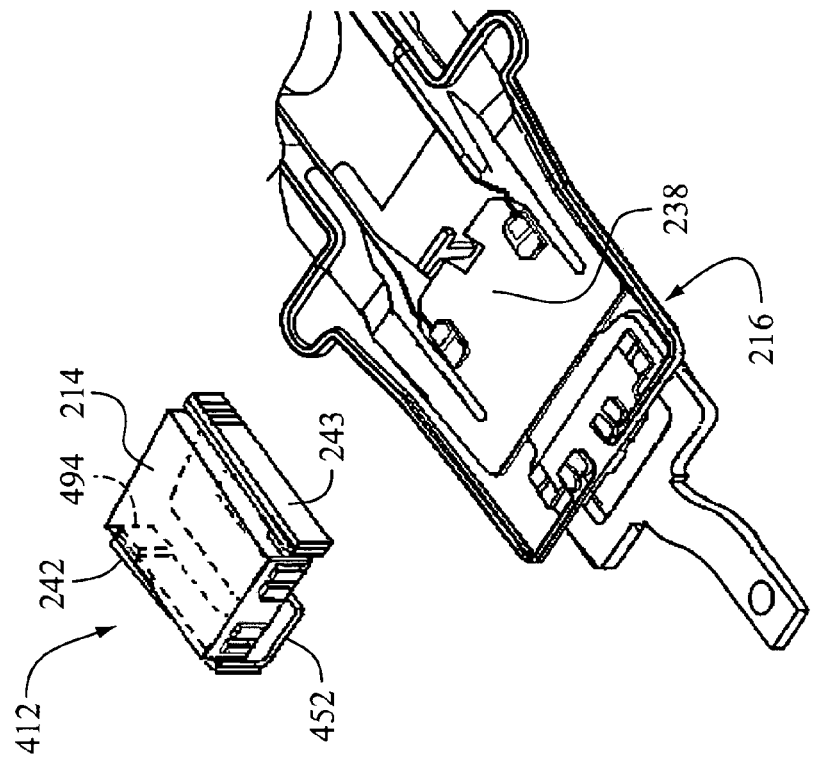
FIG. 24 is a perspective view of the PZT micro-actuator shown in FIG. 23 being mounted to the suspension of a HGA.
Figure 23:
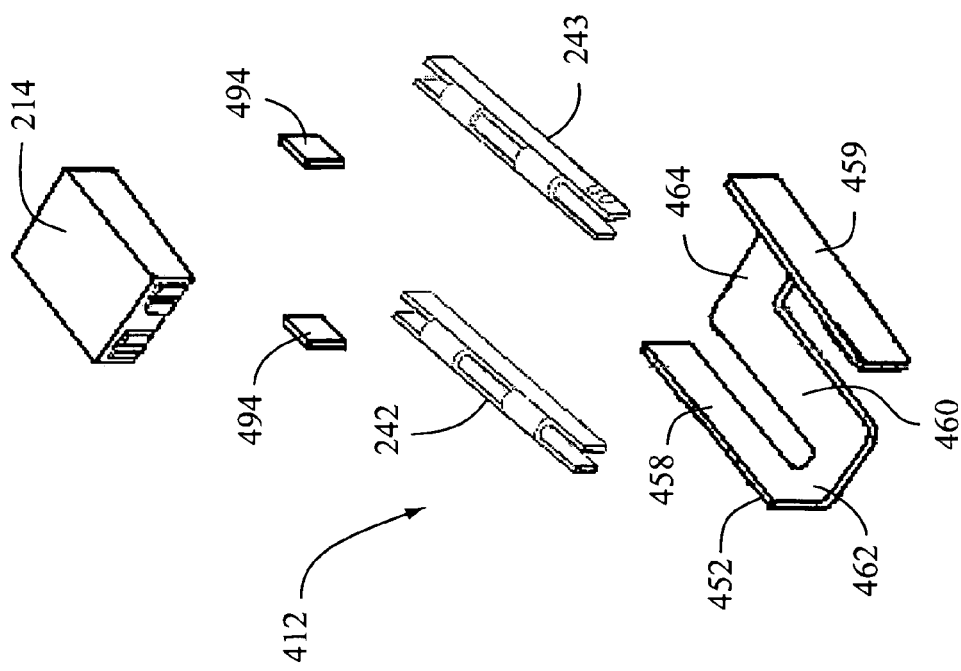
FIG. 23 is an exploded view of a PZT micro-actuator according to another embodiment of the present invention.

FIGS. 23 and 24 illustrate a PZT micro-actuator 412 according to another exemplary embodiment of the present invention. In this embodiment, the micro-actuator frame 452 has an N-type shape including side arms 458, 459, plate 460, and connection arms 462, 464 that interconnect the plate 460 with the side arms 458, 459. PZT elements 242, 243 are bent and mounted to respective side arms 458, 459 so that they sandwich respective side arms 458, 459. A slider 214 is mounted to the frame 452 by mounting a trailing side edge of the slider 214 to one side arm 458 and mounting a leading side edge of the slider 214 to the other side arm 459. The slider 214 may be mounted to the frame 452 by suitable mounting materials 494. When a voltage is input to the PZT elements 242, 243, the side arms 458, 459 will bend and cause the slider 214 to rotate. FIG. 24 shows an assembled PZT micro-actuator 412 being mounted to a suspension 216 of the type described above. The remaining components of the PZT micro-actuator 412 are substantially similar to the PZT micro-actuator 212 and indicated with similar reference numerals.

Figure 25:
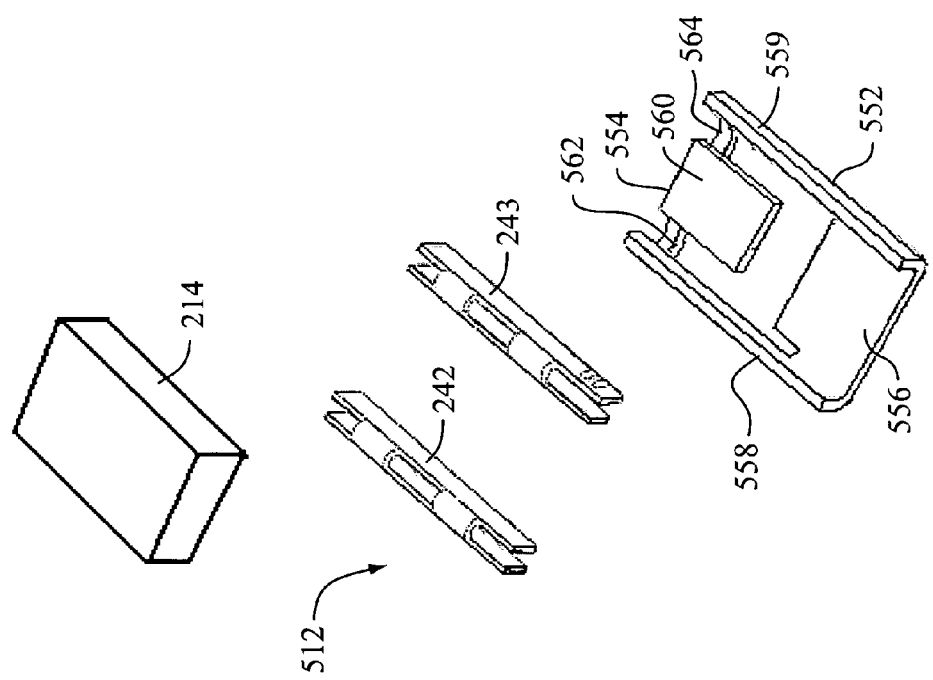
FIG. 25 is an exploded view of a slider and a PZT micro-actuator according to yet another embodiment of the present invention.

FIG. 25 illustrates a PZT micro-actuator 512 according to yet another exemplary embodiment of the present invention. In this embodiment, the micro-actuator frame 552 includes a top support 554, a bottom support 556, and side arms 558, 559 that interconnect the top support 554 and bottom support 556. The top support 554 includes a rotatable plate 560 and bridges 562, 564 that couple the plate 560 to respective side arms 558, 559. As illustrated, the bridges 562, 564 are aligned along the same axis. A PZT element 242, 243 is mounted to respective side arms 558, 559 of the micro-actuator frame 552, and a slider 214 is mounted to the plate 560. Although structurally different, the PZT micro-actuator 512 has a substantially similar work principle as the PZT micro-actuator 212.

Figure 26:
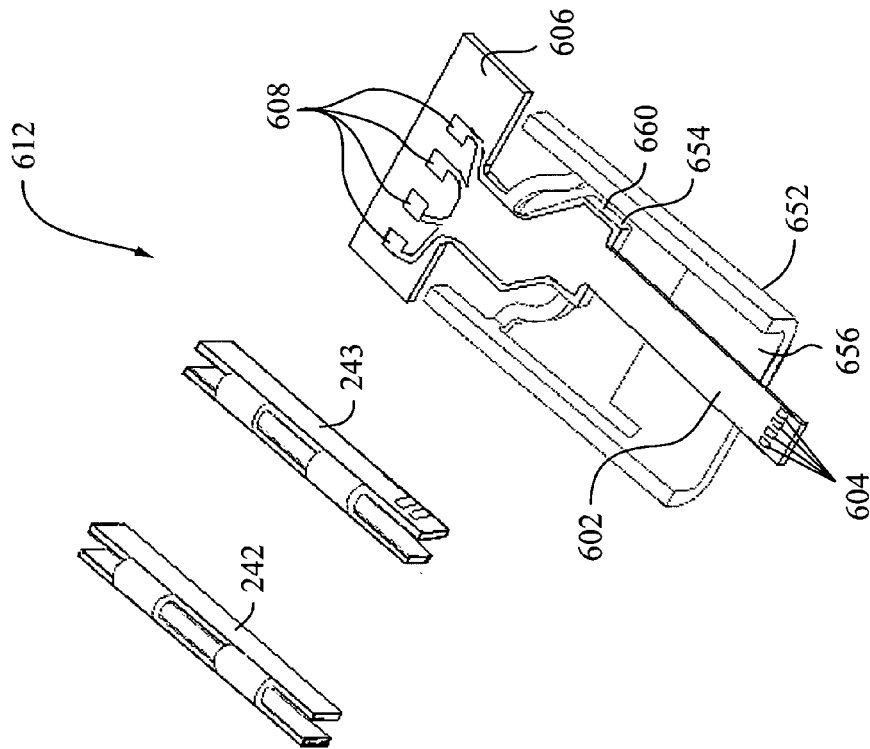
FIG. 26 is an exploded view of a PZT micro-actuator according to still another embodiment of the present invention.

FIG. 26 illustrates a PZT micro-actuator 612 according to still another exemplary embodiment of the present invention. In this embodiment, the micro-actuator frame 652 includes integrated traces 602. The traces 602 include multi pads 604 in the trail edge of the frame 652 and extends through the middle of the plate 660 of the top support 654 and the bottom support 656. A free lead 606 extends beyond the frame 652 and provides additional multi pads 608. This embodiment is structured to improve out-trace vibrations.

A head gimbal assembly 210 incorporating a PZT micro-actuator 212, 312, 412, 512, 612 according to embodiments of the present invention may be provided to a disk drive device (HDD). The HDD may be of the type described above in connection with FIG. 1. Because the structure, operation and assembly processes of disk drive devices are well known to persons of ordinary skill in the art, further details regarding the disk drive device are not provided herein so as not to obscure the invention. The PZT micro-actuator can be implemented in any suitable disk drive device having a micro-actuator or any other device with a micro-actuator. In an embodiment, the PZT micro-actuator is used in a high RPM disk drive device.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A micro-actuator for a head gimbal assembly, comprising:
 a metal frame including
  a bottom support adapted to be connected to a suspension of the head gimbal assembly,
  a top support adapted to support a slider of the head gimbal assembly, and
  a pair of side arms that interconnect the bottom support and the top support,
  the side arms extending vertically from respective sides of the bottom support and the top support; and
 a PZT element mounted to each of the side arms, each PZT element including two PZT portions supported by a PI substrate base, the PI substrate base including one or more bridges that physically and electrically couple the two PZT portions, and the bridges being bendable so that the two PZT portions sandwich the respective side arm when mounted thereto,
 wherein each PZT element is excitable to cause selective movement of the side arms.

2. The micro-actuator according to claim 1, wherein the top support includes a rotatable plate and connection arms that couple the plate to respective side arms.

3. The micro-actuator according to claim 2, wherein the connection arms of the top support have a curved configuration.

4. The micro-actuator according to claim 2, wherein the connection arms of the top support are aligned along the same axis.

5. The micro-actuator according to claim 1, wherein the PZT portions are single-layer thin-film PZT or multi-layer thin-film PZT.

6. The micro-actuator according to claim 1, wherein each PZT element includes one or more bonding pads to electrically connect each PZT element with suspension traces.

7. The micro-actuator according to claim 1, wherein the two PZT portions have different polarizations and are connected in parallel relation.

8. The micro-actuator according to claim 1, wherein each of the PZT portions includes two separate units.

9. The micro-actuator according to claim 1, further comprising an integrated trace that interconnects a first set of bonding pads with a second set of bonding pads.

10. A micro-actuator for a head gimbal assembly, comprising:
 an N-shaped metal frame including
  a pair of side arms,
  a plate, and
  connection arms that interconnect the plate with the side arms; and
 a PZT element mounted to each of the side arms, each PZT element including two PZT portions supported by a PI substrate base, the PI substrate base including one or more bridges that physically and electrically couple the two PZT portions, and the bridges being bendable so that the two PZT portions sandwich the respective side arm when mounted thereto,
 wherein each PZT element is excitable to cause selective movement of the side arms.

11. The micro-actuator according to claim 10, wherein the PZT portions are single-layer thin-film PZT or multi-layer thin-film PZT.

12. A head gimbal assembly comprising:
 a micro-actuator;
 a slider; and
 a suspension that supports the micro-actuator and the slider,
 wherein the micro-actuator includes:
 a metal frame including
  a bottom support to connect to the suspension,
  a top support to support the slider, and
  a pair of side arms that interconnect the bottom support and the top support,
  the side arms extending vertically from respective sides of the bottom support and the top support; and
 a PZT element mounted to each of the side arms, each PZT element including two PZT portions supported by a PI substrate base, the PI substrate base including one or more bridges that physically and electrically couple the two PZT portions, and the bridges being bendable so that the two PZT portions sandwich the respective side arm when mounted thereto,
 wherein each PZT element is excitable to cause selective movement of the side arms.

13. The head gimbal assembly according to claim 12, wherein the top support includes a rotatable plate and connection arms that couple the plate to respective side arms.

14. The head gimbal assembly according to claim 13, wherein the connection arms of the top support have a curved configuration.

15. The head gimbal assembly according to claim 13, wherein the connection arms of the top support are aligned along the same axis.

16. The head gimbal assembly according to claim 12, wherein the slider includes a read/write element for magnetic recording.

17. The head gimbal assembly according to claim 12, wherein the bottom support is connected to a suspension tongue of the suspension.

18. The head gimbal assembly according to claim 12, wherein the PZT portions are single-layer thin-film PZT or multi-layer thin-film PZT.

19. The head gimbal assembly according to claim 12, wherein each PZT element includes one or more bonding pads to electrically connect each PZT element with suspension traces.

20. The head gimbal assembly according to claim 12, wherein the two PZT portions have different polarizations and are connected in parallel relation.

21. The head gimbal assembly according to claim 12, wherein each of the PZT portions includes two separate units.

22. The head gimbal assembly according to claim 12, further comprising an integrated trace that interconnects a first set of bonding pads with a second set of bonding pads.

23. A disk drive device comprising:
 a head gimbal assembly including a micro-actuator, a slider, and a suspension that supports the micro-actuator and slider;
 a drive arm connected to the head gimbal assembly;
 a disk; and
 a spindle motor operable to spin the disk,
 wherein the micro-actuator includes:
 a metal frame including
  a bottom support to connect to the suspension,
  a top support to support the slider, and
  a pair of side arms that interconnect the bottom support and the top support,
  the side arms extending vertically from respective sides of the bottom support and the top support; and a PZT element mounted to each of the side arms, each PZT element including two PZT portions supported by a PI substrate base, the PI substrate base including one or more bridges that physically and electrically couple the two PZT portions, and the bridges being bendable so that the two PZT portions sandwich the respective side arm when mounted thereto, wherein each PZT element is excitable to cause selective movement of the side arms.

24. The disk drive device according to claim 23, wherein the top support includes a rotatable plate and connection arms that couple the plate to respective side arms.

25. The disk drive device according to claim 23, wherein the PZT portions are single-layer thin-film PZT or multi-layer thin-film PZT.

* * * * *